Jan. 29, 1929.

W. F. GROENE 1,700,721

CENTER DRIVE LATHE

Filed Jan. 18, 1928

INVENTOR.
William F Groene
BY
Allen & Allen
ATTORNEY.

Jan. 29, 1929.  
W. F. GROENE  
CENTER DRIVE LATHE  
Filed Jan. 18, 1928  
1,700,721  
5 Sheets-Sheet 3

INVENTOR.  
William F. Groene  
BY  
ATTORNEY.

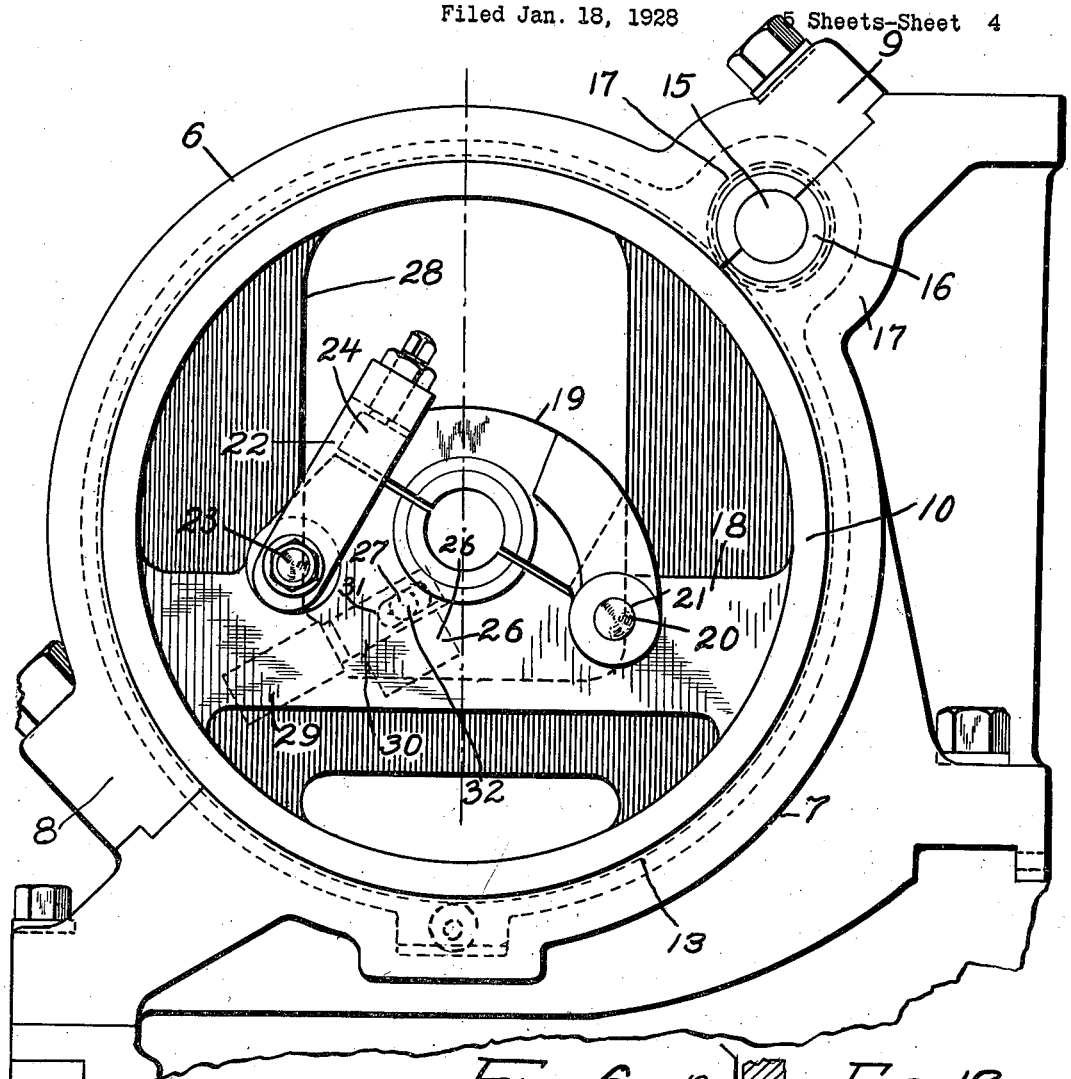
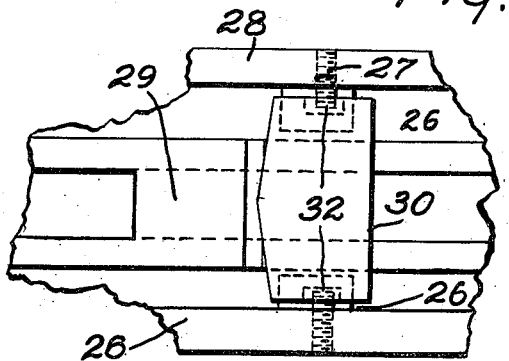
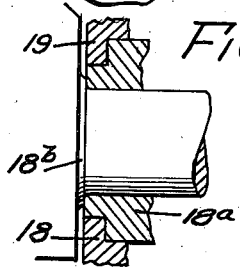

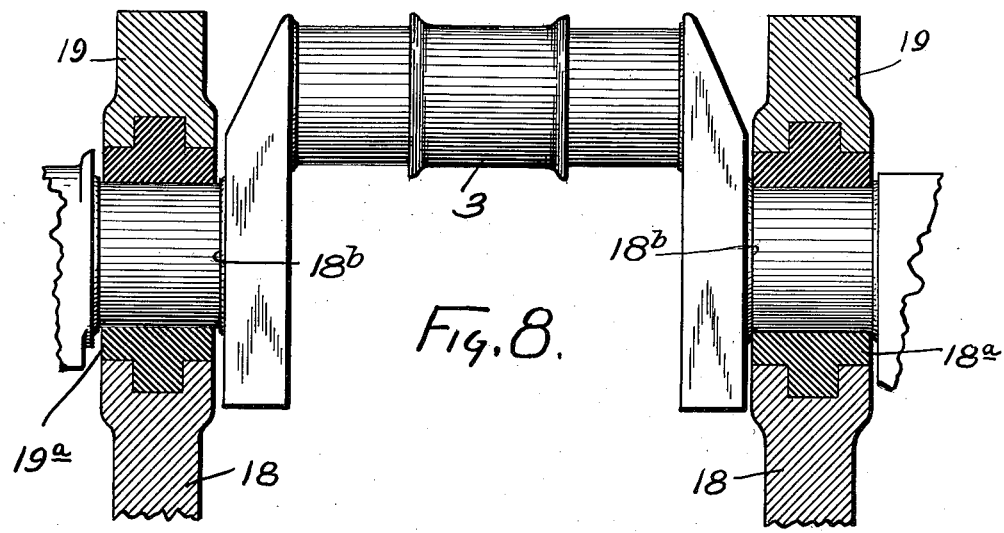
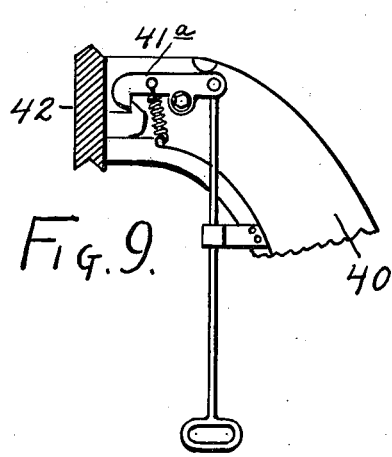
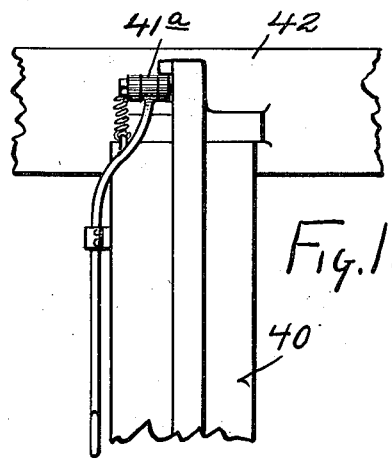
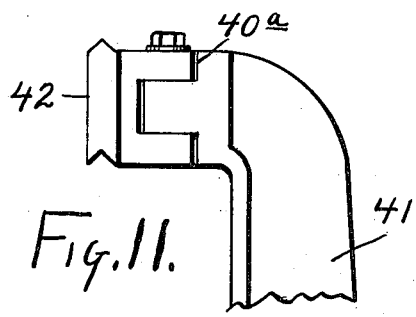

Patented Jan. 29, 1929.

1,700,721

UNITED STATES PATENT OFFICE.

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE.

CENTER-DRIVE LATHE.

Application filed January 18, 1928. Serial No. 247,715.

My invention relates to the provision in lathes for a centrally driven and centrally located chucking device for engaging and rotating the work, thus leaving a space between the spindles and the chucking device on each side of the work, where turning operations can be simultaneously practiced.

More specifically my invention relates to crank shaft lathes for turning or forming the stub and flange ends and pins of crank shafts simultaneously, and other operations of similar character, having provisions for rigidly holding a crank shaft on a previously turned bearing or bearings, and means for driving and also for locating a shaft endwise in the lathe.

It is my object to provide for a hollow, externally driven member, having jaws to engage the work, located intermediate the spindles of a lathe to serve as the chucking element of a lathe, said member being on a fixed center at all times, and not movable except in a rotary manner. In order to permit the workman to charge a piece of work into the machine he must then insert it endwise through the hollow member, and to provide for this operation, it is my object to use a crane device.

The crane device is movable in a fixed relation with the chucking member, and according to my invention the crane arm is such as to hold the work rigidly while charging and removing it, and to be free to swing sufficient to clear the work after the charging operation is complete, and when moving into position to engage the work prior to removal.

As distinguished from center drive lathes of the past, in which the center drive chuck swings away from working position while the work is being loaded and unloaded, which requires the manipulation of a split bearing, the operation of my device is steadier and much stronger, as well as being more rapidly and easily operated.

In the device illustrated in the drawings I have shown and in the specification I specifically describe a selected and preferred type of chucking member, crane, and operating mechanism for the same, which is suitable to the particular structure illustrated. It will be understood, however, that the invention inherent in the structures, and which is set forth in the appended claims, is not limited to the embodiment shown, but may take various forms dependent upon the requirements of the machine that are desired.

In the drawings:—

Figure 6 is an end elevation of the chuck on a larger scale.

Figure 7 is a detail of the equalizer device used in connection with the abutment element of the drive.

Figure 8 is a detail illustrating the centering arrangement within the chuck.

Figures 9, 10 and 11 are details of a modified mounting of the crane track.

Figure 12 is a detail of a crank shaft journal and chuck jaw.

Figure 1:
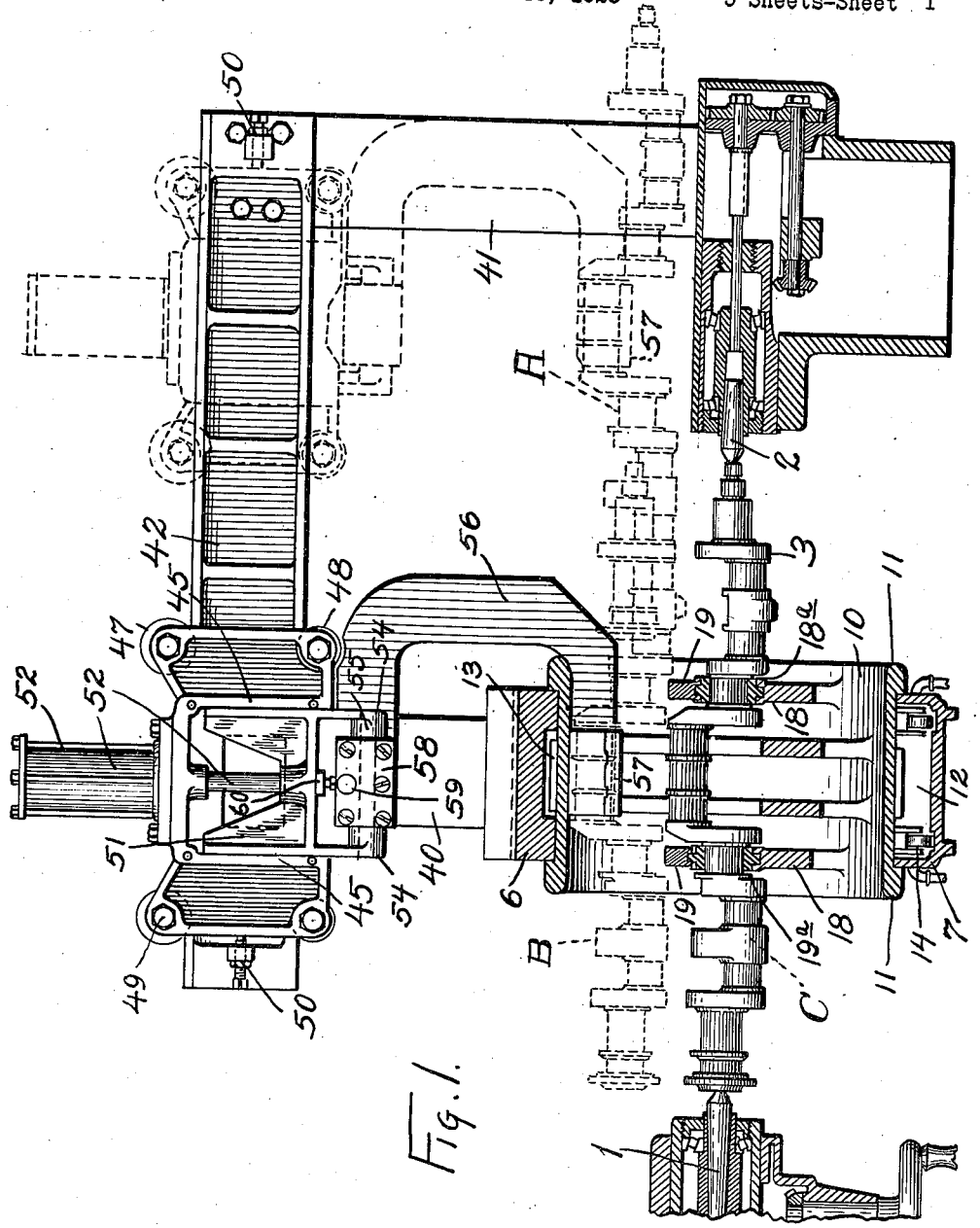
Figure 1 is a central longitudinal vertical section taken through parts of a lathe embodying my invention, with the crane in side elevation, and shown in two positions.
Figure 2:
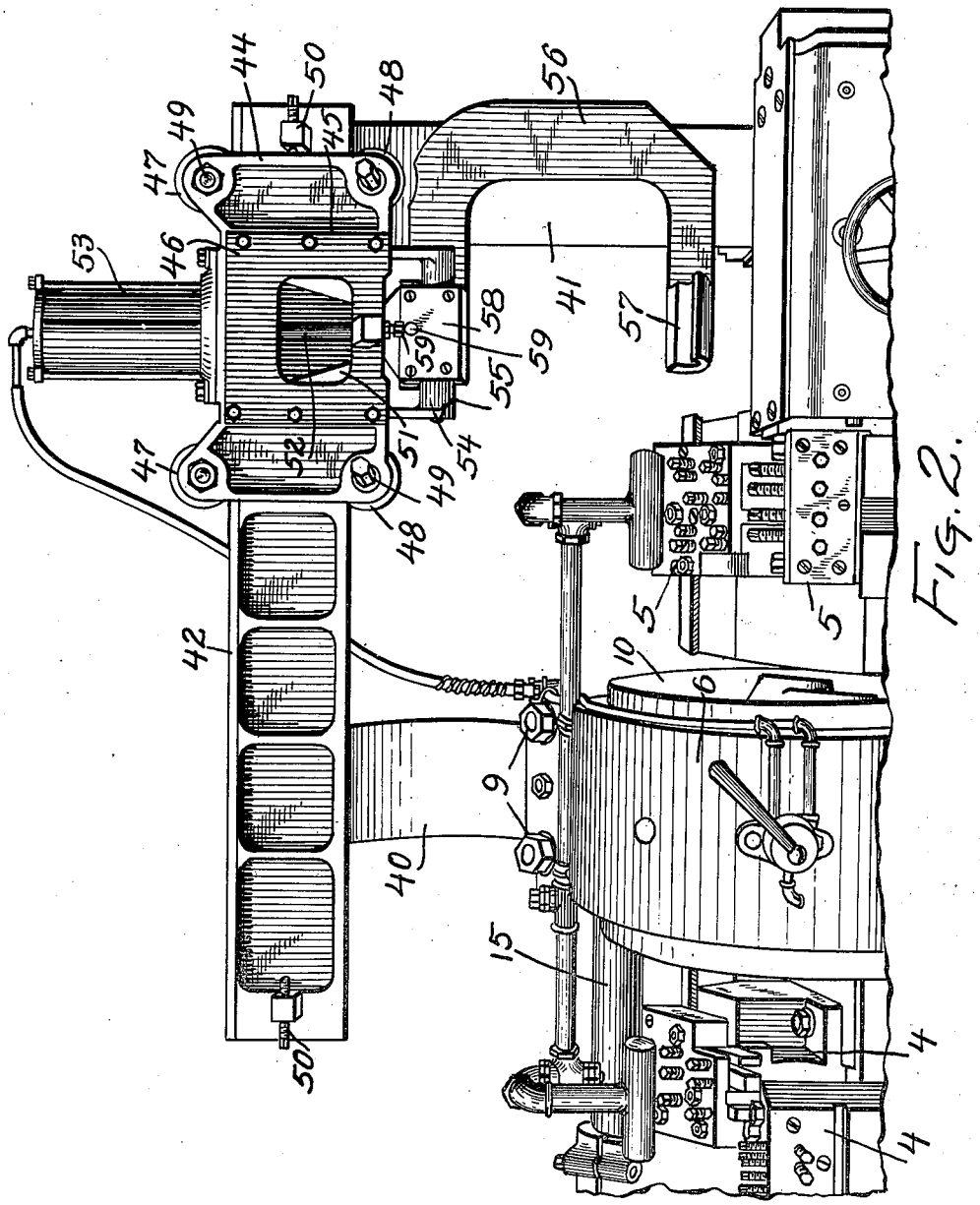
Figure 2 is a perspective view of a lathe showing the crane in removed position.

I have not shown an entire lathe since this is not required for a full explanation of my invention. The centers 1 and 2 are shown as engaging a crank shaft 3, of which the stub and flange ends are to be formed.

I show two front and two rear facing slides at 4, 4, and 5, 5, respectively. A housing located centrally of the bed of the lathe for housing the chuck, is shown as having two parts 6 and 7, which are complementary and bolted together at 8 and 9.

The chuck body 10 is wider than the housing, and is formed as a cylinder with ribs 11, 11 extending inwardly at the outer edges thereof, to engage over the outside of the housing. The housing has a central channel 12, and the chuck body has gear teeth at 13, which are cleared by the channel 12. At the lower end of the housing I may provide for a set of rollers 14, on which the chuck body will ride.

A shaft 15 extending from the head stock of the lathe, has a pinion 16 thereon, which is held within the portions 17, 17 of the two halves of the housing, and meshes with the gear teeth on the chuck body.

The chuck body is heavily ribbed internally for strength and rigidity, and has two integral portions 18, forming one of the work gripping jaws of the chuck. The movable jaws 19 are pivoted by pins 20 in holes 21 in the jaw portions 18, and swing bolts 22, pivoted at 23 in the jaw portions 18, swing over to engage the ends 24 of the movable jaws. This jaw construction is of familiar type and does not require detailed notice, nor is it critical to the machine to provide any particular type of jaw device.

It is important to note, however, that the bushing parts $18^a$ in the one gripping jaw is such as to fit accurately over a selected bearing of the crank shaft, and when the shaft is lowered into position from the crane, if it is not accurately centered, it will automatically adjust itself to the bushing $18^a$. The bushing $19^a$ in the other work gripping jaw is made smaller than the length of the bearing of the crank shaft which it engages, thus permitting this slight adjustment.

As will be described, the loading device can be adjusted to insert the shaft to an accurate position. The fillets $18^b$ at the sides of the journal on the crank shaft will engage both sides of the part $18^a$, which will give a very fine adjustment to the shaft. The other jaw part $19^a$ will not interfere with this action.

Figures 3, 4, 5:
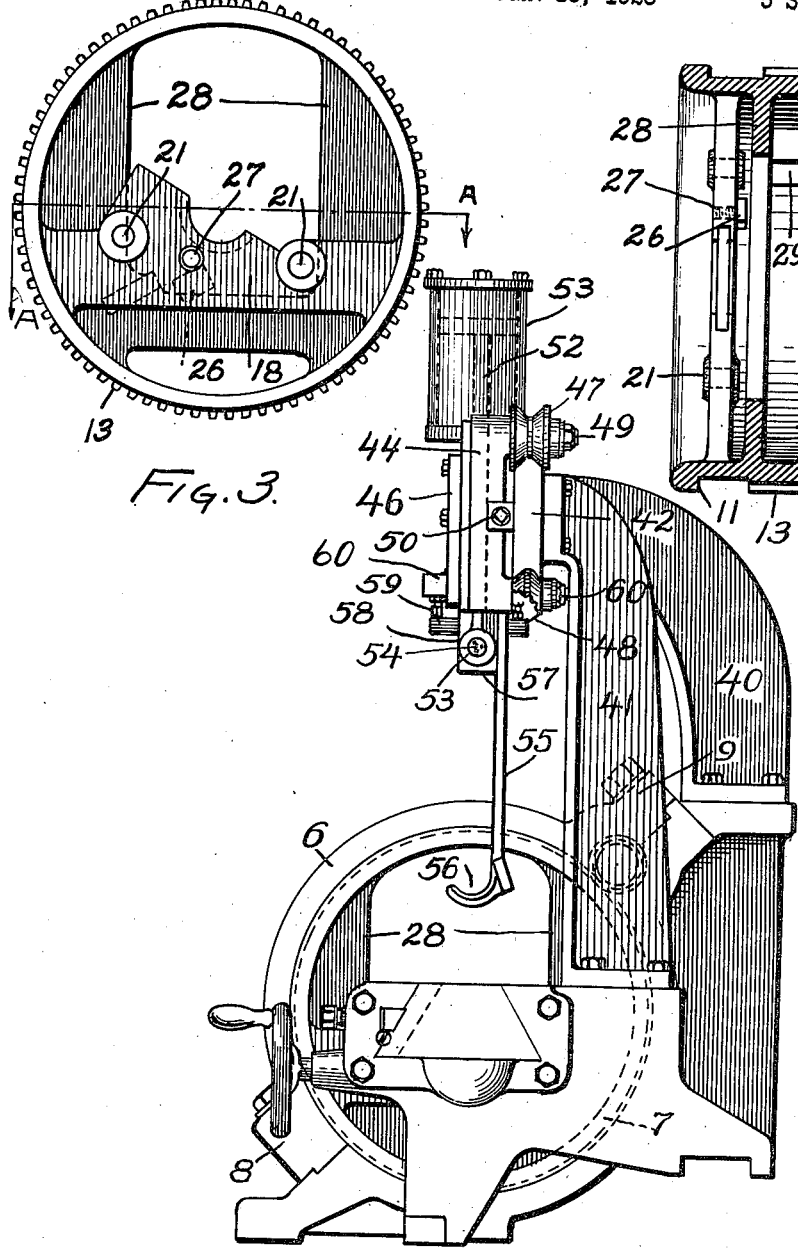
Figure 3 is a detail elevation of the frame portions of the chucking member.
Figure 4 is a section on line A—A of Figure 3.
Figure 5 is an end elevation of the crane structure and the chuck.

On the two jaw ribs 18, 18 of the chuck body (Fig. 4) are lugs 26, 26, and threaded holes 27, 27 above the lugs provide for a pair of mounting bolts. The ribs 28, 28 of the chuck body are connected together in the lower forward portion of the chuck body with an integral block 29. (Figs. 4 and 7.) The block forms an abutment for a contact bar 30, which has holes 31, 31 in its ends, in which lie loosely the heads of the bolts 32, 32, said bolts being located in the holes 27.

The contact bar thus lies on the two lugs 26, and can shift with relation thereto. It has a V-shaped underside, and the apex of the V-shaped underside or edge is the portion of the contact bar that engages the block 29.

This contact bar engages a portion of the crank shaft which lies between the two jaws, in the space defined by the ribs 28, 28.

The opportunity of this contact bar to rock on its mounting will permit it to adjust itself to irregularities in the shape of the shaft being operated upon. It is one of the improvements in our structure to provide an equalizing driving lug in the center drive chuck.

When changing the machine from one type of shaft to another, a different shaped contact bar can be used, and also the bushings in the gripping jaws will be arranged to accomplish the function above described.

In order to move a crank shaft into the chuck endwise, when the movable jaws are swung back to clear the lower jaws, I provide for a crane.

Standards 40, 41 support a plate 42, having an internal inverted V-shaped lower edge and an external inverted V-shaped upper edge. This plate 42 is permanently mounted, as shown in the drawings, but could be made with a pivotal connection at $40^a$ on one standard and a locking bolt connection at $41^a$ to the other standard as shown in Figs. 9, 10 and 11.

A carriage is provided to move along the plate 42, said carriage being formed of a metal plate 43, having deep flanges 44 around its edges, and a pair of intermediate ribs 45, over which intermediate ribs is secured a cover plate 46.

The rollers 47 and 48, to match the edges on the top and bottom of the plate, are mounted on pins 49 which lie in bosses formed at the corners of the outer ribs or flanges of the carriage plate. These rollers ride along upon the crane plate, and hold the carriage firmly in a vertical position. An adjustable stop screw 50 prevents the carriage from moving off of the plate, and is so set as to locate a crank shaft as accurately as possible with relation to the chuck, at the inner end of the crane movement.

The space between the two central ribs of the carriage provides a housing within which slides a block 51, said block being secured to the piston rod 52 of a suitable air cylinder operating device 53.

This air cylinder or other power means is mounted on the top of the carriage and moves with it, and will have a flexible power connection.

The block 51 has two arms which project downwardly through a space left between the surrounding ribs on the carriage plate, and terminate in bosses 54, 54, in which is mounted a pivot pin 55 for the crane arm.

The crane arm 56 is generally U-shaped so as to permit of its lower end being inserted into the chuck body. The lower end of the crane arm has a hollow receiving member 57, shaped to engage the central pin of the crank shaft to be loaded into the machine.

The upper portion of the crane arm has a block 58 thereon, which is journaled over the pivot pin 55. A heavy pin 59 is mounted in the upper portion of the block, above its pivot point, and projects at both the front and back of the block and crane arm. An abutment 60, located in the underside of the carriage in a boss projecting from the cover plate 46, strikes the forward end of this pin, and a like screw 61 in a boss on the back of the carriage strikes the other end of the pin, at such times as the crane arm is drawn up by the air cylinder into position of establishing the contact noted.

The crane arm thus cannot swing on its pivotal connection to the sliding block that is actuated by the air cylinder when the arm is drawn up into contact with the abutment screws, which point can be adjusted by means of the screws.

In charging a shaft, the air cylinder is operated to bring the crane arm to its upper position, with the carriage moved away from a position over the chuck. At this time the crane arm will be rigid, and the crank shaft can be set into the holding member, the operator using both hands.

This position of the parts is illustrated in dotted lines at A in Fig. 1.

The operator then moves the carriage so as to thrust the crank shaft through the chuck and bring the axial journals thereof which are to be gripped in the jaws of the chuck into position over them. It will be convenient to adjust the adjustable stop screw to stop the crane arm at just the correct position to bring the shaft into chucking relation to the jaws.

The position of the shaft at B, in Fig. 1, illustrates this second stage of charging.

The operator then actuates the air cylinder to permit the crane arm to drop, which it does, so as to deposit the crank shaft in correct position within the chuck (position C, Fig. 1).

The arm of the crane is now free to swing, and the operator moves it slightly on its pivot, so as to swing from beneath the shaft, whereupon the crane arm can be pulled back by hand.

When ready to remove the shaft, the operation is reversed, and it will be noted that when the crane arm has been elevated by the air cylinder, and holds the crank shaft in position B again, that the rigid relation of the arm to the carriage will again be established, whereupon the crank shaft can be withdrawn from the lathe without danger of tipping, or striking any of the tools, marring the shaft or injuring the operator.

Having thus described a typical mechanism illustrative of my invention, and noted its operation, what I claim as new and desire to secure by Letters Patent, is:—

1. In a lathe the combination with a bed, and centers for the lathe, of a fixed housing intermediate the centers, a rotary chuck held by said housing, and means for driving said chuck, and a loading device associated with said bed, and comprising a work holding member movable so as to insert the work endwise through the chuck, said member having movement axially of the chuck and means for maintaining the said member rigid as the member inserts the work in the chuck.

2. In a lathe, a chuck having a rotary hollow body through which the work projects, work gripping means within the body, and means for abutting against the work and driving the same comprising a bar loosely mounted at its ends within the body, and having an abutment within the body against which it engages, said bar having a taper face which engages against the abutment, whereby an equalizing action is provided.

3. In a lathe, a chuck having a rotary hollow body through which the work projects, work gripping means within the body, a driving element within the body having a compensating movement and arranged to abut the work, and means for rotating the body, said work gripping means arranged to engage journals on the work and the driving element constituting the sole element that establishes driving relation between the chuck and the work.

4. In a crank shaft lathe having a center drive chuck, a loading device therefor comprising in combination with the bed of the lathe, a support having fixed relation to the said bed, an arm movable along the said support, in a direction for thrusting a crank shaft into the chuck, and means on the arm for engaging a crank shaft, power means for actuating the arm, and means for holding the arm rigidly when in position for loading and unloading a shaft from the chuck, and pivotally when in position of release of the shaft when the latter is engaged by the chuck.

5. In a crank shaft lathe having a center drive chuck, a loading device therefor comprising in combination with the bed of the lathe, a support extending in a direction lengthwise of the bed, and means for holding it in fixed relation to the bed, a carriage arranged to travel on said support, a member movable vertically in said carriage, and a crank shaft supporting arm pivotally mounted on said vertically movable member, together with abutment means for the arm on the carriage to hold the arm rigid against pivoting, when said arm is in loading position.

6. In a crank shaft lathe having a center drive chuck, a loading device therefor comprising in combination with the bed of the lathe, a support extending in a direction lengthwise of the bed, and means for holding it in fixed relation thereto, a carriage movable on said support, and a crank shaft supporting arm having a projection on its lower end on which a crank shaft is supported in position to be thrust into the chuck, said projection being so shaped and located as to enter the chuck with the shaft thereon, and means for mounting said supporting arm on the carriage.

7. In a crank shaft lathe having a center drive chuck, a loading device therefor comprising in combination with the bed of the lathe, a support extending in a direction lengthwise of the bed, and means for holding it in fixed relation thereto, a carriage movable on said support, and a crank shaft supporting arm having a projection on its lower end on which a crank shaft is supported in position to be thrust into the chuck, said projection being so shaped and located as to enter the chuck with the shaft thereon into the chuck, and means for mounting said supporting arm on the carriage, and power means for raising and lowering the arm with relation to the carriage.

8. In a crank shaft lathe having a center drive chuck, a loading device therefor comprising in combination with the bed of the lathe, a support extending in a direction lengthwise of the bed, and means for holding it in fixed relation thereto, a carriage movable on said support, and a crank shaft supporting arm having a projection on its lower end on which a crank shaft is supported so as to permit thrusting of the projection with the shaft thereon into the chuck, and means for mounting said supporting arm on the carriage, said arm having a pivotal relation to the carriage, and means at one position which fixes the arm against pivoting.

9. In a crank shaft lathe, a loading device for inserting a crank shaft into a chuck, comprising a member on which the shaft is held, means for guiding the path of said member to move it in a line to insert a shaft into the chuck, and means for moving the member relative to the horizontal plane of the lathe, said member being pivotal with relation to the last named means and means for holding the member rigid when in one horizontal plane, for the purpose described.

10. In a crank shaft lathe, a loading device for inserting a crank shaft into a chuck, comprising a member on which the shaft is held, means for guiding the path of said member to move it in a line to insert a shaft into the chuck, and means for moving the member relative to the horizontal plane of the lathe, said member being pivotal with relation to the last named means and means for holding the member rigid when in one horizontal plane, for the purpose described, in combination with a stop located with relation to the chuck for defining a position of the member when the crank shaft to be loaded is in position for engagement by the chuck.

11. In a center drive chuck, the combination with means therein to engage over bearings on a crank shaft constituting the work at a plurality of points, the engaging means at one of said points arranged to accurately fit a bearing on the crank shaft so as to center the same, and the engaging means at another of said points arranged to permit some endwise movement of the engaged portion of the crank shaft.

12. In a center drive chuck, the combination with crank shaft bearing gripping jaws located at two points within the chuck, bushings in the jaws, the bushing in one of the jaws of a size and shape to center the bearing engaged by it lengthwise and axially of the chuck, and the bushing in the other of said jaws of a size to permit some endwise movement of the crank shaft bearing engaged by it.

13. In a lathe the combination of a center drive chuck into which a crank shaft must be inserted endwise, means within the chuck arranged to center the crank shaft automatically in its axial position with relation to the chuck, and a loading device movable axially of the chuck for inserting a crank shaft into the same, said loading device having a stop whereby the shaft will be delivered in approximate position for engagement by the automatic centering means.

14. In a crank shaft lathe, having a center drive chuck, means within the chuck for engaging a bearing on the crank shaft, said means arranged to fit a previously turned bearing on the crank shaft accurately, and a charging device for inserting crank shafts into the lathe, said charging device having a movement limiting means and arranged to deliver a crank shaft to the chuck in a position with the said bearing in position for engagement by the said means within the chuck.

15. In a crank shaft lathe, having a center drive chuck, means within the chuck for engaging a bearing on the crank shaft, said means arranged to fit a previously turned bearing on the crank shaft accurately, and a charging device for inserting crank shafts into the lathe, said charging device having a movement limiting means and arranged to deliver a crank shaft to the chuck in a rigidly held manner and in a position with the said bearing in position for engagement by the said means within the chuck.

16. In a lathe, a center drive chuck, means for inserting a shaft into the chuck to a definite axial position and means within the chuck for centering a crank shaft axially and circumferentially.

17. In a lathe, a center drive chuck, means for inserting a shaft into the chuck to a definite axial position and means within the chuck for automatically centering a crank shaft axially and circumferentially.

18. In a center drive chuck lathe, means movable in an axial direction with relation to the chuck while held rigidly against other movement, and then downward to deposit a crank shaft in the chuck, said means having a member to hold the shaft, and means in the chuck to engage two cheeks of the crank, and having an equalizing movement whereby the shaft is centered circumferentially when deposited in the chuck.

WILLIAM F. GROENE.